United States Patent [19]

Barnes et al.

[11] Patent Number: 5,782,486
[45] Date of Patent: Jul. 21, 1998

[54] RAPID GAS-FILL APPARATUS AND METHOD

[75] Inventors: F. Michael Barnes, Dunnellon; Benjamin Gregory Shepherd, Fruitland Park, both of Fla.

[73] Assignee: New Lenox Industries, Inc., Dunnellon, Fla.

[21] Appl. No.: 560,573

[22] Filed: Nov. 17, 1995

Related U.S. Application Data

[63] Continuation-in-part of Ser. No. 296,675, Aug. 26, 1994, abandoned, which is a continuation-in-part of Ser. No. 276,179, Jul. 15, 1994, Pat. No. 5,720,519, which is a continuation-in-part of Ser. No. 92,725, Jul. 16, 1993, abandoned.

[51] Int. Cl.$^6$ ........................................... B60R 21/26
[52] U.S. Cl. ........................ 280/737; 137/68.13; 222/3
[58] Field of Search ............................. 280/737, 736, 280/741; 137/68.13, 68.19, 68.23, 68.25; 222/3, 5

[56] References Cited

U.S. PATENT DOCUMENTS

| | | | |
|---|---|---|---|
| Re. 28,624 | 11/1975 | Lewis et al. | 280/736 |
| 3,088,478 | 5/1963 | Schimmel | 137/68.13 |
| 3,109,553 | 11/1963 | Fike et al. | 137/68.13 |
| 3,191,533 | 6/1965 | Hopson, III | 137/68.13 |
| 3,414,292 | 12/1968 | Oldberg et al. | 222/5 |
| 3,514,124 | 5/1970 | Richardson . | |
| 3,753,576 | 8/1973 | Gorman . | |
| 3,777,772 | 12/1973 | Arnold et al. | 280/737 |
| 3,801,156 | 4/1974 | Granig . | |
| 3,829,124 | 8/1974 | Charns et al. | 280/737 |
| 3,834,729 | 9/1974 | Oka et al. | 280/737 |
| 3,854,491 | 12/1974 | Bryan et al. | 280/737 |
| 3,879,057 | 4/1975 | Kawashima et al. . | |
| 3,917,023 | 11/1975 | DeRosa . | |
| 3,975,037 | 8/1976 | Hontschik et al. . | |
| 4,265,468 | 5/1981 | Suszko et al. . | |
| 4,268,065 | 5/1981 | Granig . | |
| 4,311,339 | 1/1982 | Heath . | |
| 4,345,791 | 8/1982 | Bryans et al. . | |
| 4,381,829 | 5/1983 | Montaron . | |
| 4,561,675 | 12/1985 | Adams et al. . | |
| 4,834,420 | 5/1989 | Sankrithi et al. . | |
| 4,981,534 | 1/1991 | Scheffe | 280/741 |
| 5,100,169 | 3/1992 | Goor et al. . | |
| 5,161,820 | 11/1992 | Vollmer . | |
| 5,184,844 | 2/1993 | Goor . | |
| 5,251,931 | 10/1993 | Semchena et al. . | |
| 5,433,476 | 7/1995 | Materna et al. | 280/736 |
| 5,527,066 | 6/1996 | Svensson | 280/737 |

FOREIGN PATENT DOCUMENTS

| | | |
|---|---|---|
| 4235373 | 4/1993 | Germany . |
| 2260780 | 4/1993 | United Kingdom . |

OTHER PUBLICATIONS

International Search Report mailed 3 Nov. 1994 in PCT/US94/07942.

*Primary Examiner*—Peter C. English
*Attorney, Agent, or Firm*—Harness, Dickey & Pierce, PLC

[57] ABSTRACT

A rapid gas/fluid deploying apparatus for use in a variety of inflating and dispersing applications includes a superatmospheric pressure compressed gas/fluid storage container which is equipped with an explosively rupturable membrane surface element and an explosively rupturing micro miniature charge assembly. When the explosive charge is detonated a pressure equilibrating force compels the gas or fluid into/onto a receiving volume or target.

12 Claims, 3 Drawing Sheets

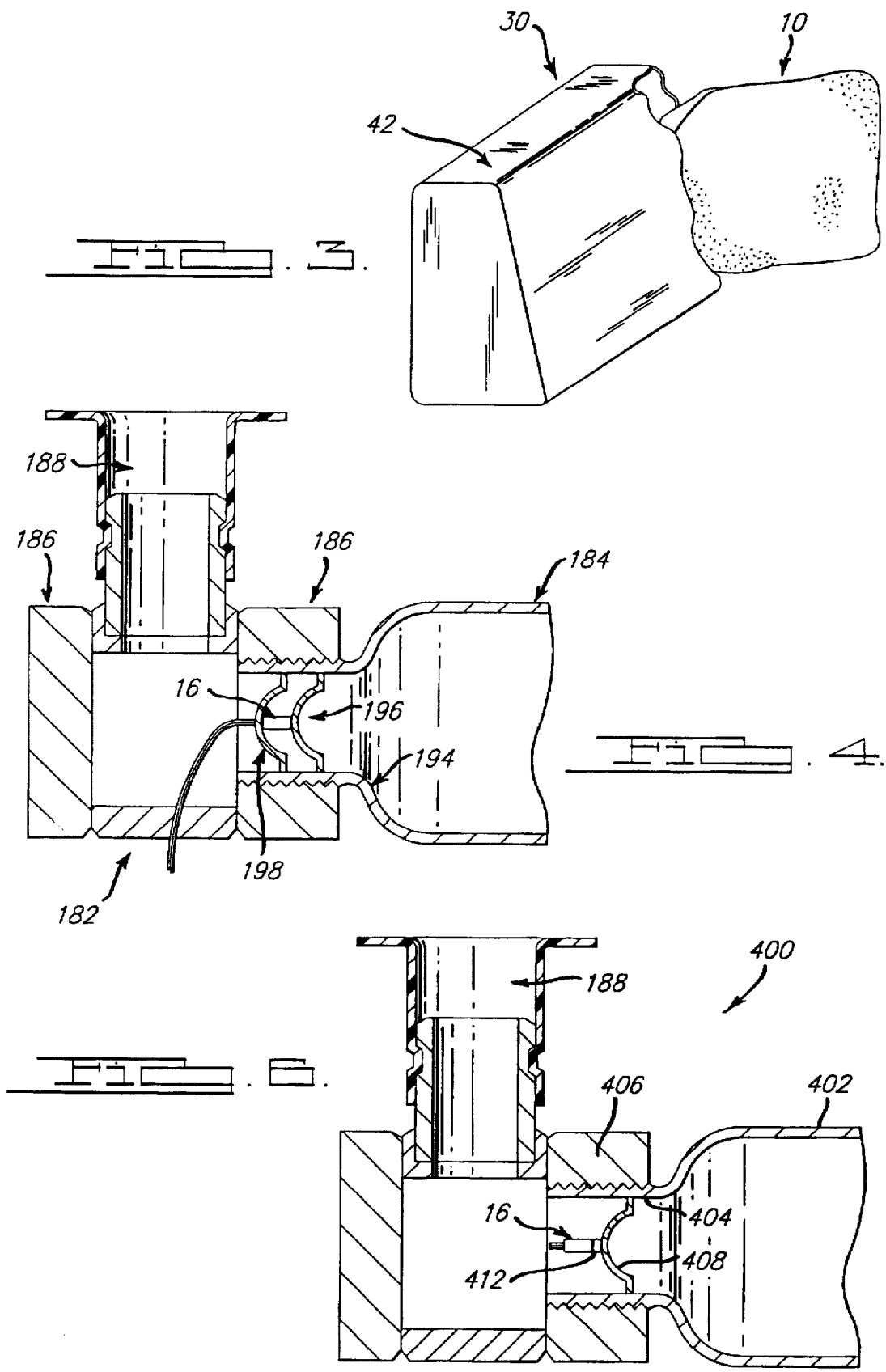

RAPID GAS-FILL APPARATUS AND METHOD

CROSS REFERENCE TO RELATED APPLICATIONS

This application is a continuation-in-part of U.S. application Ser. No. 08/296,675, filed Aug. 26, 1994 in the name of F. Michael Barnes, abandoned, which is a continuation-in-part of U.S. application Ser. No. 08/276,179, filed Jul. 15, 1994 in the name of F. Michael Barnes, U.S. Pat. No. 5,720,519, which is a continuation-in-part of U.S. application Ser. No. 08/092,725, filed Jul. 16, 1993 in the name of F. Michael Barnes, abandoned.

BACKGROUND OF THE INVENTION

1. Field of the Invention

This invention relates generally to the field of rapidly deployable superatmospheric pressure compressed gas fill systems, for use with both gas inflatable devices and gas dispersing apparatus. The invention further relates to an explosive pyrotechnic initiated compressed gas propellant driver, for use in conjunction with air bags and other devices requiring high speed movement of gas which does not generate heat or toxic gas, has an extended and more reliable useful life expectancy, and is less expensive to manufacture than current alternative devices.

2. Description of the Related Art

The value of air bag deployment shielding/cushioning devices in automobiles has been proven to a degree that such devices have been heralded by industry groups, consumer advocates, and governmental agencies alike as an excellent means for reducing traffic injuries and fatalities. In fact their incorporation into automobiles has been mandated by many governments (e.g. Germany). Variations on the standard deployable air bag include: the "airbank" system, which utilizes multiple air bags to fully insulate front seat passengers in collisions; seat mounted air bags for use in school buses; newly suggested side mounted and head rest mounted air bags for protecting passengers from side collisions; as well as the integrated child seat air bag system disclosed in related co-pending U.S. patent applications Ser. No. 08/276,179, filed Jul. 15, 1994 in the name of F. Michael Barnes, and Ser. No. 08/092,725 filed Jul. 16, 1993 in the name of F. Michael Barnes.

An important element of an air bag system is its gas volume propellant or inflator. Current air bag inflators employ pyrotechnic technology (sodium azide/potassium nitrate), which is ill-suited for use with other gas deploying devices including the specifically disclosed integrated child seat air bag system of the references related applications. In particular, sodium azide, conventionally used in the propellant for pyrotechnic inflators, is extremely toxic to humans and animals. It will be appreciated that, in conjunction with a child safety restraint system, a head protective shield, as well as a variety of alternate uses for rapid gas deploying apparatus, a propellant utilizing a toxic substance would be of great concern and potential danger.

Further, sodium azide is extremely flammable and toxic, and correspondingly must be handled in a clean room environment under carefully controlled conditions. Such hazardous character increases the manufacturing costs. Moreover, recently the life expectancy and, therefore, the long-term reliability of sodium azide inflators has been questioned.

In addition, heat produced by the combustion of a gas-generating propellant material is excessive. Moreover, due to uncontrollable variables in propellant burning, a dynamically filled air bag system is required. Thus, a dynamic air bag is designed with vents which emit jets of scalding hot gasses during deployment. Such jets of scalding hot gases are incompatible for use in conjunction with head shielding air bags or child safety seat deployable cushions.

In addition, it is further appreciated that applications exist or may exist in the future in which the speed of deployment of the gas volume required exceeds the ability of the standard air bag-type assemblies.

SUMMARY OF THE INVENTION

It is, therefore, an object of the present invention to provide a gas deploying apparatus which incorporates a non-toxic material propellant means and non-toxic propellant.

It is still further an object of the present invention to provide a gas deploying apparatus which eliminates any burn or fire hazard.

It is still further an object of the present invention to provide a gas deploying apparatus which eliminates the requirement of dynamically inflating receiving volumes, alternatively allowing the receiving volume to maintain the contents therein deployed by the propellant means.

It is still further an object of the present invention to provide a gas deploying apparatus which comprises an inflator means which is less expensive and more safely manufacturable.

It is still further an object of the present invention to provide a gas deploying apparatus which responds more rapidly than prior devices.

The foregoing objects of the invention are accomplished by providing a volume of deployable gas stored under superatmospheric pressure in explosively deployable gas flow communication with a receiving volume, whereby actuation of a suitable inflator rapidly deploys the content of the high pressure volume into the receiving volume. The explosively deployable relation is suitably maintained by means of a frangible or otherwise explosively rupturable barrier/conduit between the pressurized volume and the receiving volume.

The suitable inflator, which in the context of the presently disclosed invention comprises a micro miniature shaped charge assembly, is an electrically initiated, nondelay high-explosive device which has been used successfully in space, military, nuclear, and other applications in which absolute reliability must be maintained through adverse conditions for extended periods of time. The micro miniature charge assembly, because of its superior construction and design, further provides a deploying device several times faster than the prior art.

One embodiment of the present invention comprises an air bag assembly, which, while appropriate for all present air bag uses, is further specifically applicable when incorporated in side impact head shields or child safety seat air bag systems. In such an embodiment a volume of superatmospheric pressure compressed inert gas, preferably helium, is maintained within a container comprising or otherwise associated with a frangible or otherwise explosively rupturable barrier through which the superatmospheric pressure contents of the container may exit when ruptured. An inflatable volume comprising the air bag is a flexible container designed and disposed in gas flow receiving communication either directly with the rupturable barrier, or in conjunction with a conduit intermediately disposed in gas flow communication between the high pressure container at the rupturable barrier and the inflatable volume. The barrier rupturing gas flow communication establishing event proceeds by the controlled detonation of a micro miniature shaped charge assembly disposed appropriately in relation to the barrier, wherein the charge comprises a nontoxic material, produces no scalding hot combustion products, and the speed of response to the controller is in excess of that required by the application. The barrier rupturing event may advantageously be automatically controlled by remote sensing and an actuator in electrical communication with the explosive charge assembly. The sensor may sense either extreme accelerations, impact vibrations, or other measurable signals which characterize, and may be used to immediately identify, a collision. The air bag system (including the sensor) may be housed within either a child safety seat, the head rest, the side wall assembly, or other position within the car in accordance with the desired application of the present embodiment of the invention.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 3 is a perspective view of a head rest deployed air bag according to a variation of the air bag embodiment of the present invention;

FIG. 4 is an enlarged cross-sectional view of a portion of the inflator as embodied in one potential aspect of the present invention;

FIG. 6 is an enlarged cross-sectional view of a portion of an inflator in accordance with another embodiment of the present invention;

DETAILED DESCRIPTION OF THE PREFERRED EMBODIMENT

While the present invention will be described more fully hereinafter with reference to the accompanying drawings, in which particular embodiments are shown, it is to be understood at the outset that persons skilled in the art may modify the invention herein described while achieving the functions and results of this invention. Accordingly, the descriptions which follow are to be understood as illustrative and exemplary of specific structures, aspects and features within the broad scope of the present invention and not as limiting of such broad scope of the present invention.

Figure 1:
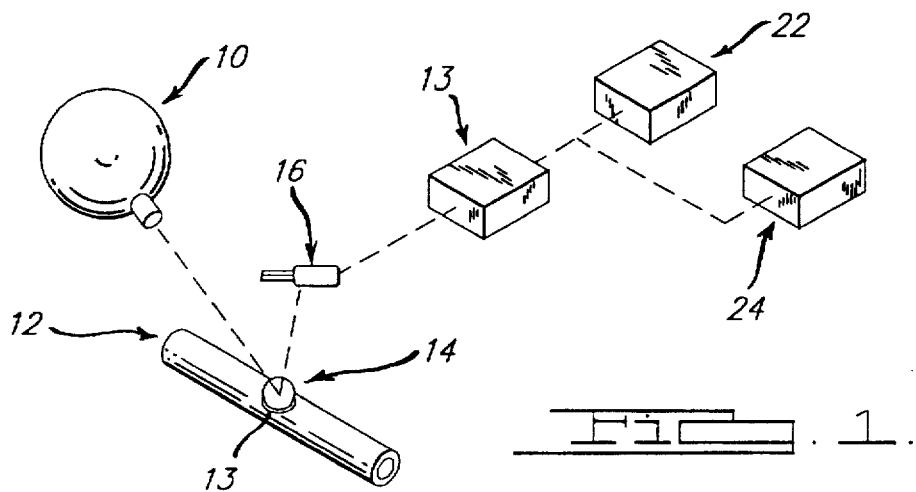
FIG. 1 is a schematic representation of a car seat\headrest\child seat\side wall air bag system according to aspects of the present invention.

Referring now to the drawings in which like reference numerals designate like or corresponding parts throughout the several views, as shown in FIGS. 1 through 5, an air bag deploying device as embodied in two possible variations is disclosed. FIG. 1, in a schematic view, illustrates the five fundamental elements of an air bag deploying apparatus according to this aspect of the present invention. An air bag 10 comprises a gas receiving structure defining a first interior volume for receiving a pressurized gas. Air bag 10 is coupled by a coupling element 14 in gas flow communication with a gas storing container 12 enclosing a second interior volume for storing within a superatmospheric pressure compressed gas. By way of example coupling element 14 could be a positionally clamped fluid transport conduit structure. The gas stored within container 12 may comprise an inert gas. As used herein, the term "inert gas" refers to any medium which is non-reactive with the inflator system, it components, and environs. An explosively rupturable barrier region 13, at least partially enclosed by coupling element 14, on the surface of container 12 forms a barrier between the first interior volume of gas receiving structure 10 and the second interior volume of gas storing container 12. The explosively rupturable barrier can be of a variety of different embodiments including a frangible membrane, such membrane also optionally including mechanically scored weakened portions thereof, thereby enhancing the rupturability of the barrier. An electrically actuatable micro miniature explosive charge assembly 16 is positioned in electrically actuatable explosively rupturing relationship to the explosively rupturable barrier member 13, within coupling element 14. The detonation of the shaped charge assembly 16 explosively ruptures gas barrier membrane 13 and releases the superatmospheric gas stored in the second interior volume in container 12 through coupling element 14 and into the first interior volume of air bag 10. The detonation is actuated by an electrical actuation signal producing element 18. The initiation of electrical actuation signal producing element's 18 signal being controlled by sensors 22 and 24. Sensors 22 and 24 are sensitive to, and initiate electric signal producing element 18 in response to sensing, an impact or collision characteristic input, and may for example be operatively coupled with a collision avoidance system.

Figure 1A:
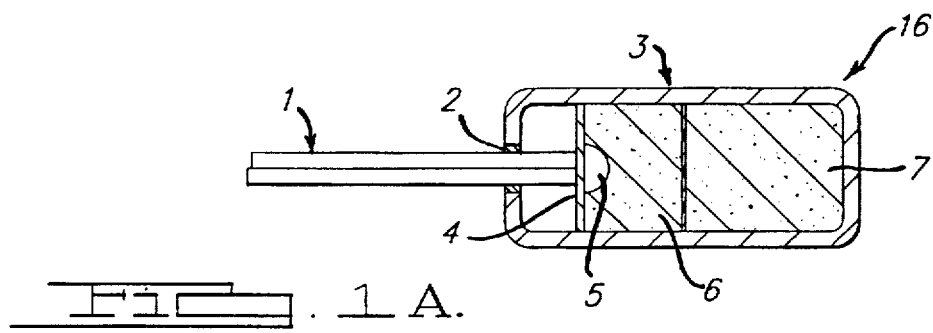
FIG. 1A is a cross-sectional view of the electrically actuatable micro miniature explosive charge assembly as used in the invention.

Referring now to FIG. 1A, a cross-sectional view of electrically actuatable micro miniature shaped charge assembly 16 of FIG. 1 is illustrated. As used herein, the term "micro miniature" as used in reference to an electrically actuatable shaped charge assembly means an assembly structure having an explosive charge with no dimension greater than one centimeter. Preferably all dimensions of the shaped explosive charge (e.g. x,y,z dimensions) are less than seven millimeters. In FIG. 1A, the shaped charge assembly shown generally at 16, is comprised of elements 1 through 7. The electrically actuating signal is carried to the assembly 16 along a contact pin 1. Contact pin 1 is fixedly held in an externally extending-inserted relationship with a charge housing 3 by a sealing element 2. Contact pin 1 is further in electrically conducting communication with a resistance element 4 used as a detonation firing initiator in heat and/or charge transferring relationship with a primer material 5. By way of example the resistive element may be a microfine drawing wire, (e.g., 0.00285 in diameter Moleculoy™ wire, commercially available from Dyna Nobel), rapidly and energetically vaporizing in a detonating initiating fashion under the influence of the actuation current. Primer material 5 (a suitable primer material is lead styphnate although the present invention is not limited to this material) is in contact with a primer charge 6 (an illustrative primer charge material is lead azide although the present invention is not limited to this material). Primer charge 6 is in contact with the main charge 7 (an advantageous main charge disclosed in the prior art is formed of cyclotetramethylene tetranitroamine (HMX) although the present invention is not limited to this material).

Figure 2:
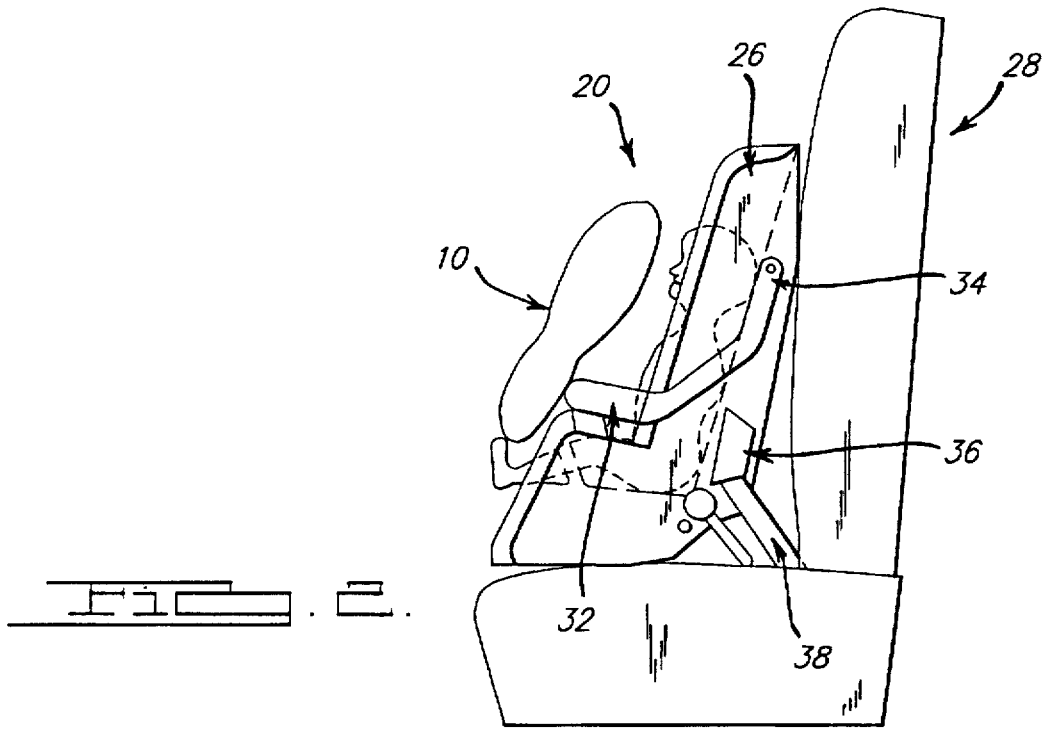
FIG. 2 is a side view of a child's car seat according to one embodiment of the present invention, as installed in the restraining bar of the seat and showing the air bag inflated.

Referring now to FIG. 2, a child safety seat 26 assembled to a car seat 28 incorporates an air bag device according to the present invention illustrated generally at 20. Child safety seat 26 comprises a child seating means or seating structure fastenably attachable to a car seat 28 by strapping, buckling, or another equivalent securing element 38 at a securing element receiving structure 36. Child safety seat 26 further comprises a swing down restraining arm 32 attached in swingable relation to child safety seat 26 at a hinge point 34. Another embodiment of the invention incorporates a child safety seat air bag deploying apparatus as described schematically in FIG. 1 and further described in one potential embodiment in FIG. 4 (as hereinafter more fully described; not directly shown in FIG. 2). The child safety seat air bag deploying apparatus of FIG. 2 has been actuated in the view shown in FIG. 2, as evidenced by inflated air bag 10.

Referring now to FIG. 3, a head rest deployable air bag assembly according to the present invention is illustrated in a break away view generally at 30. Head rest 42 comprises an air bag deploying apparatus as described schematically in FIG. 1 and more fully described hereafter in one potential embodiment as shown in FIG. 4. Head rest deployable air bag assembly shown in FIG. 3 has been actuated in the view shown, as evidenced by inflated air bag 10.

Referring now to FIG. 4, an enlarged cross-sectional view of an air bag deploying device is illustrated generally at 182. A gas storing container 184 constructed to withstand super-atmospheric pressures has a neck 194 which is threaded onto a manifold 186. By way of example for a child safety seat deployable or a head rest deployable air bag apparatus, the volume of the gas storing container 184 is approximately 15 cubic centimeters and the storage pressure is 175 times standard atmospheric pressure. Any suitable gas may be employed, preferably an inert gas such as helium. For the purposes of comparison, the inflated volume of air bag 10 (shown in FIG. 2) coupled at 188 is 2250 cubic centimeters. It will be appreciated that employing container 184 of a known volume storing under a known pressure results in a controllable and predictable volume of gas for inflating air bag 10, avoiding the need for a dynamic air bag having a vent.

Preferably located in neck 194 of pressure container 184 are a pair of explosively rupturable frangible membranes 196 and 198, arranged in series for sealing the gas under pressure within container 184. The thickness of each of the disk shaped membranes is preferably 0.125 millimeters, and the preferred diameter is 1.25 centimeters. Suitable membrane disks are manufactured by Continental Disks of Liberty, Mo.

Positioned between frangible membranes 196 and 198 is electrically actuatable micro miniature explosive charge assembly 16 for explosively rupturing frangible disk membranes 196 and 198. While in principle a single one of frangible membranes 196 and 198 is sufficient, having two frangible disk membranes 196 and 198 allows shaped charge assembly 16 to be positioned therebetween and rendered essentially inaccessible to prevent tampering.

Frangible disk membranes 196 and 198 may be welded into the neck 194 of the pressure container 184 itself by laser welding, electron beam welding, friction welding or the like.

Alternatively, frangible disk membranes 196 and 198 may be included as part of manifold 186. During the assembly, container 184 and manifold 186 are assembled and sealed together in a chamber at operational pressure. After assembly, container 184 and manifold 186 are carefully weighed to ensure proper pressure loading. A high sensitivity gas leak test may be performed to verify hermetic integrity. The use of helium as the pressurized gas simplifies this leak test due to the fact that helium is one of the easiest gasses to detect. In addition, the use of helium also provides additional benefits because it is close to an ideal gas, it is non-corrosive, it is an inert, noble gas and it is relatively inexpensive.

Figure 5:
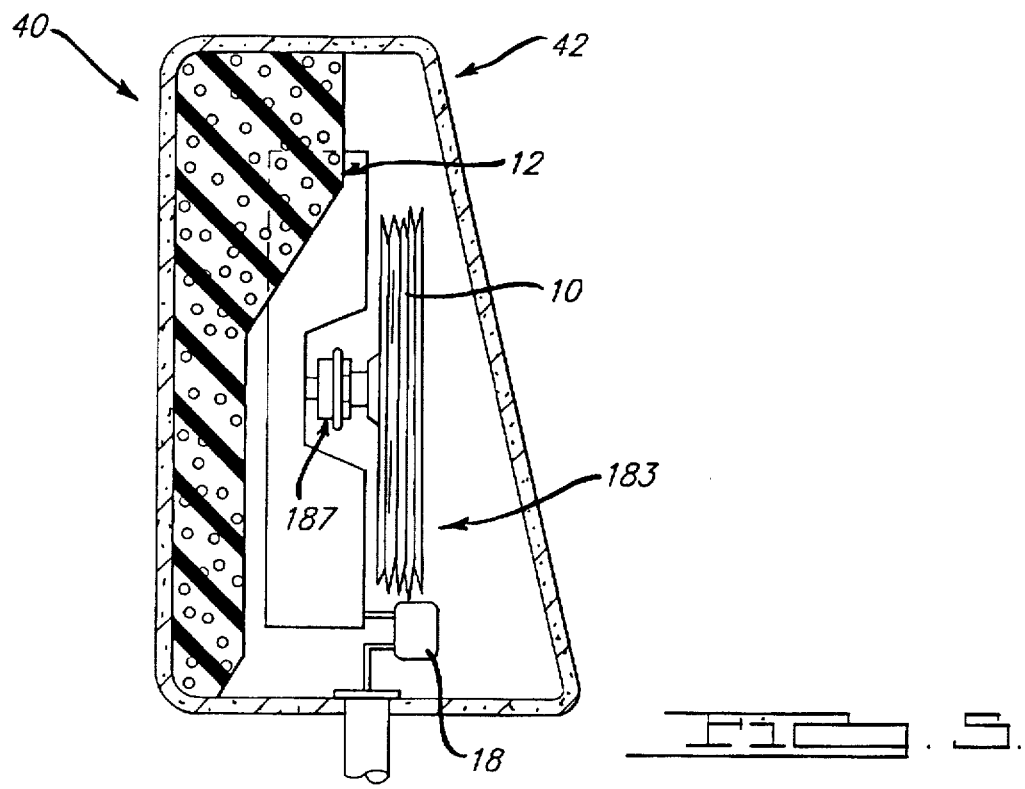
FIG. 5 is a view partially in cross-section of the head rest air bag deployable system according to a variation of the air bag embodiment of the present invention.

Referring now to FIG. 5, a cross-sectional view of a head rest deploying air bag apparatus in accordance with one aspect of the invention is shown generally at 40. Head rest deploying air bag apparatus 40 includes a head rest body 42 and an air bag assembly 183. Within head rest body 42 is housed deployable air bag assembly 183 as illustrated schematically in FIG. 1 and enlarged cross sectionally in FIG. 4. In the present variation of such an embodiment of the present invention, gas storing container 12 is matably engaged in gas flow communication with air bag 10 at a manifold or gas conduit element 187. Within manifold 187 is an explosively rupturable barrier element (not shown here, but shown in FIG. 4 as frangible disk membranes 196 and 198) and an electrically actuatable micro miniature shaped charge assembly (also not shown here, but generally disclosed in FIGS. 1 and 4 and specifically shown in FIG. 1A as element 16) disposed in explosively rupturing communication with the barrier element. Attached in electrically conducting communication with the explosive charge assembly within manifold 187 is electrical actuator 18 further in remote but signal receiving communication with input recognizing and automatic decision making elements (not shown here, but schematically shown in FIG. 1 as sensors 22 and 24).

Referring now to FIG. 6, an enlarged cross-sectional view of an air bag deploying device according to another embodiment of the present invention is illustrated generally at 400. A gas storing container 402 constructed to withstand super-atmospheric pressures includes a neck 404 which is threadably received by a manifold 406. Gas storing container 402 is preferably filled with helium to a specific pressure to ensure complete inflation of air bag 10 coupled at 188 or complete inflation of any one of the other previously described embodiments. The advantages to using helium have been described above.

Figure 7:
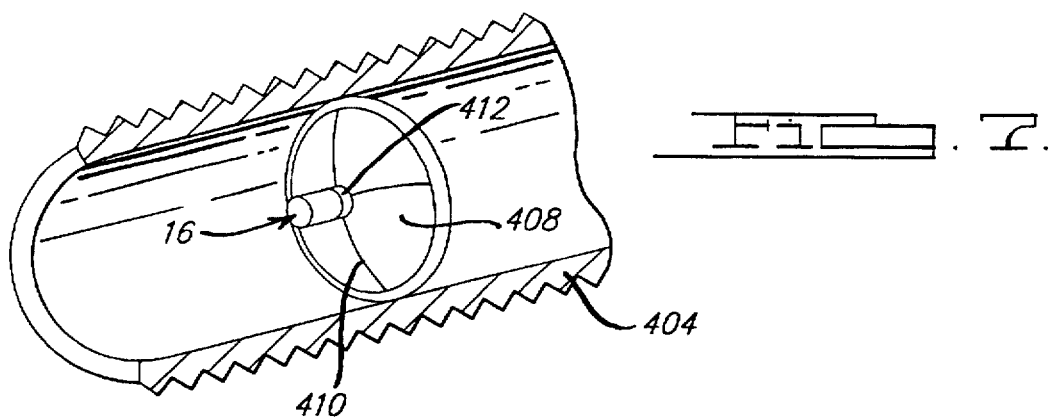
FIG. 7 is a perspective view of a portion of the inflator shown in FIG. 6 prior to the rupturing of the membrane.
Figure 8:
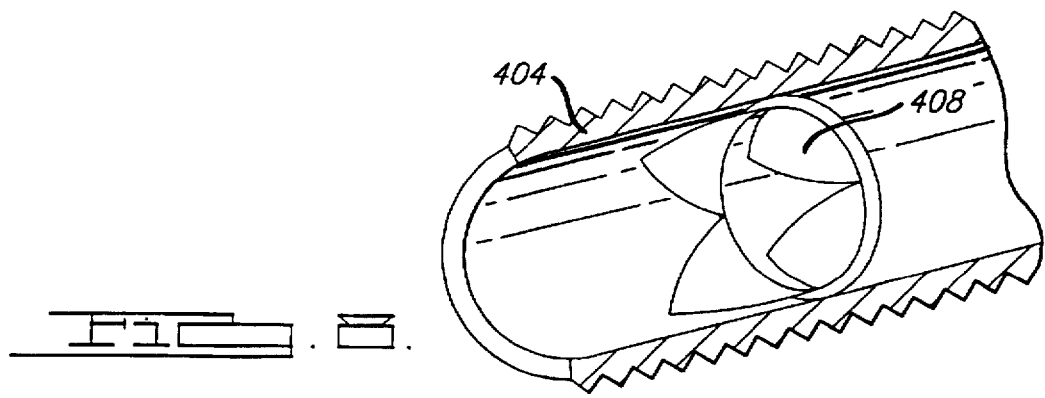
FIG. 8 is a perspective view of a portion of the inflator shown in FIGS. 6 and 7 after the rupturing of the membrane.

An explosively rupturable frangible membrane 408 is located within neck 404 for sealing the gas under pressure within container 402 from low pressure or atmospheric pressure on the side of membrane 408 opposite to container 402. Membrane 408 is preferably manufactured from 316-stainless steel although other materials will function satisfactorily. As shown in FIGS. 7 and 8, membrane 408 is a generally domed shaped membrane which is scored to produce a plurality of scored weakened areas 410. Areas 410 enhance the rupturability of membrane 408 and ensure that membrane 408 will self-rupture when the gas under pressure within container 402 reaches a specified over-pressure condition. Thus, scribed membrane 408 operates as a safety valve should container 402 be exposed to excessive heat due to a fire or other conditions causing an over-pressure condition within container 402. Scribed membrane 408 is designed to self-rupture prior to the failure of container 402. Membrane 408 may be welded into neck 404 in a similar manner described above for membranes 196 and 198.

Electrically actuatable micro miniature explosive charge assembly 16 is fixedly secured to the low pressure or atmospheric pressure side of membrane 408 using an electrically conductive epoxy 412. Epoxy 412 preferably contains silver which provides the desired electrical conductivity to epoxy 412. The electrical conductivity of epoxy 412 facilitates the electrical connection of assembly 16. The electrical circuit includes contact pin 1, resistance element 4, housing 3 (shown in FIG. 1A), epoxy 412, membrane 408 and finally container 402 and manifold 406.

Device 400 is normally in its sealed position as shown in FIGS. 6 and 7. The actuation of deployment device 400 is initiated by an electrical signal being supplied to contact pin 1 (FIG. 1A) by electrical signal producing element 18 or another electrical signal producing device. Contact pin 1 is in electrical communication with resistance element 4 which acts as a detonation firing initiator. Element 4 is in heat and/or charge transferring relationship with primer 5 which is in contact with primer charge 6 which is in turn in contact with main charge 7 (FIG. 1A). The detonation of assembly 16 essentially vaporizes assembly 16 and produces a shock wave which is propagated through epoxy 412 and into membrane 408. The minute size of assembly 16 in conjunction with the essential vaporization of the assembly produces a minimal amount of heat and only a minimal amount of shrapnel. The small amount and small size of the shrapnel produced by the detonation of assembly 16 does not interfere with the operation of device 400 nor is it detrimental to air bag 10 or the other devices during and after inflation.

The detonation of assembly 16 causes the controlled rupturing of membrane 408 along the plurality of scribed weakened areas 410 from the low pressure or atmospheric side of membrane 408 only. As membrane 408 is ruptured, it remains attached or secured to neck 404 and is petaled outward or folded around the periphery of neck 404 to fully open the interior passage defined by neck 404 as is shown in FIG. 8. Thus the rupturing of membrane 408 by assembly 16 does not generate any significant shrapnel which may be detrimental to air bag 10 or the other devices during or after inflation. In addition, the inflation of the device by air bag deploying device 400 is an endothermic flow of compressed gas and not an exothermic reaction which occurs in the prior art pyrotechnic technology air bags. The only heat generated is from the detonation of micro miniature explosive charge assembly 16 and this amount of heat is insignificant.

While the above detailed description describes the preferred embodiment of the present invention, it should be understood that the present invention is susceptible to modification, variation and alteration without deviating from the scope and fair meaning of the subjoined claims.

What is claimed is:

1. A gas flow apparatus comprising:
    a gas receiving structure defining a first interior volume for receiving pressurized gas;
    a gas storing container defining a second interior volume, said gas storing container further defining a fluid passageway between said second interior volume and said first interior volume of said gas receiving structure;
    an explosively rupturable frangible membrane secured to said gas storing container, said frangible membrane being disposed between said first and second interior volumes;
    a compressed gas disposed within said gas storing container and having said second interior volume; and
    an actuatable micro miniature explosive charge assembly having an explosive charge having a shape defined by a plurality of dimensions, each of said plurality of dimensions being less than one centimeter, said explosive charge assembly being secured to said explosively rupturable frangible membrane by an electrically conductive epoxy for establishment of endothermic gas flow communication between said first interior volume and said second interior volume upon actuation of said explosive charge assembly by explosively rupturing said frangible membrane to substantially fully open said fluid passageway establishing immediate flow of said compressed gas from said second interior volume to said first interior volume, said rupturing occurring without releasing said frangible membrane from said gas storing container.

2. The apparatus according to claim 1 wherein, said frangible membrane is mechanically scored to enhance explosive rupturability thereof.

3. The apparatus according to claim 1 wherein, said compressed gas is an inert gas.

4. The apparatus according to claim 3 wherein, said inert gas is helium.

5. The apparatus according to claim 1 wherein, the gas receiving structure comprises a compacted, pressurized gas-expandable structure.

6. The apparatus according to claim 5 wherein, said compacted, pressurized gas-expandable structure comprises an inflatable bag.

7. The apparatus according to claim 1 wherein, said explosive charge assembly comprises a housing containing a primer charge, a main charge, a primer material in contact with said primer charge, a resistance element in contact with said primer material, and a contact pin in contact with said resistance element and extending exteriorly of said housing.

8. The apparatus according to claim 7 wherein, said primer material comprises lead styphnate, said primer charge comprises lead azide, and said main charge comprises cyclotetramethylene tetranitroamine (HMX).

9. A gas dispersing apparatus comprising:
    a container enclosing an interior volume, said container defining a fluid passageway extending between said interior volume and an exterior environment, said passageway being closed by an explosively rupturable frangible member;
    a compressed fluid disposed within said container and having said interior volume;
    an actuatable micro miniature explosive charge assembly having an explosive charge having a shape defined by a plurality of dimensions, each of said plurality of dimensions being less than one centimeter, said explosive charge assembly being secured to said explosively rupturable frangible member by an electrically conductive epoxy for establishment of immediate fluid flow communication from said interior volume to said exterior environment upon actuation of said explosive charge assembly by explosively rupturing said frangible member to substantially fully open said fluid passageway establishing immediate flow of said compressed fluid from said interior volume; and
    an actuator for detonating said micro miniature explosive charge assembly.

10. The apparatus according to claim 9 wherein, said frangible member is mechanically scored to enhance explosive rupturability thereof.

11. The apparatus according to claim 9 wherein, said explosive charge assembly comprises a housing containing a primer charge, a main charge, a primer material in contact with said primer charge, a resistance element in contact with said primer material, and a contact pin in contact with said resistance element and extending exteriorly of said housing.

12. The apparatus according to claim 11 wherein, said primer material comprises lead styphnate, the primer charge comprises lead azide, and said main charge comprises cyclotetramethylene tetranitroamine (HMX).

* * * * *